Patented Feb. 23, 1932

1,846,727

UNITED STATES PATENT OFFICE

ALPHONS O. JAEGER, OF ST. LOUIS, MISSOURI, ASSIGNOR TO THE SELDEN COMPANY, OF PITTSBURGH, PENNSYLVANIA, A CORPORATION OF DELAWARE

PURIFICATION OF CRUDE AROMATIC HYDROCARBONS

No Drawing. Application filed April 12, 1926. Serial No. 101,561.

This invention relates to the purification of crude aromatic hydrocarbons, and, more particularly, to the purification of light distillates from coal and oil tar and light oils condensed from coal gas.

Crude coal or oil tar distillates are usually washed with dilute acid and with alkali to remove bases and acid compounds such as phenols, followed by repeated washing with small amounts of concentrated sulfuric acid. This process is open to many objections. In the first place, while sulfuric acid removes some unsaturated compounds fairly well, many acyclic compounds such as paraffins and $CS_2$ besides other sulfur compounds, alicyclic compounds and heterocyclic compounds such as thiophenes are not removed or are only partially removed. The resulting commercial hydrocarbons such as commercial benzene, toluene, xylene, solvent naphtha, etc., are not sufficiently pure for many purposes.

It is possible to obtain highly purified hydrocarbons by the use of a sufficiently large amount of sulfuric acid and oleum but the losses of hydrocarbons are so high as to render the process commercially impracticable. A further drawback lies in the fact that the sludge which contains acid resins and other impurities is frequently considerably decomposed by the acid and is therefore of little or no value.

In my co-pending application, Serial No. 86,099, filed February 4, 1926, I have described and claimed a method of purifying crude aromatic hydrocarbons by selective halogenation whereby the impurities are changed into compounds having boiling points for the most part considerably above that of aromatic hydrocarbons and in the case of carbon disulfide into carbon tetrachloride which is harmless for most purposes owing to its great chemical inertness. I have also described the use of various halogen carriers, such as iodine, bromine, sulfur compounds, metal chlorides, compounds of antimony and the like. In this application, I have further described the production of sludges which consists in large part of halogen bodies and can be used as a raw material for obtaining solvents and other useful bodies, whereas sludges produced by sulfuric acid wash are for the most part worthless.

The present invention consists in a combination of the features of selective halogenation and acid washing and comprises the advantages of both processes, at the same time increasing the efficiency of either.

While retaining all of the advantages of the acid wash process such as cheapness and the like, the present invention produces sludges of as high quality as those described in my co-pending application, above referred to, and from which sludges many valuable products, such as solvents, light colored resins, such as cumaron and indene resins, and the like are produced. In addition, the sulfuric acid wash may actually increase the effectiveness of the halogenation treatment. A further advantage consists in the fact that it is possible to remove certain undesirable and worthless products by means of sulfuric acid so that when the partially purified distillate is treated with halogen, the resulting halogenated products which are later separated by distillation are free from the undesired products which have been removed by the sulfuric acid and are accordingly more suited to commercial utilization and constitute more valuable products. The sequence of treatments with acid and halogen according to the present invention can be most varied. Thus, the distillates can be freed from phenols and bases by treatment with alkali and dilute acid and then given one or more washes with concentrated sulfuric acid followed by treatment with halogen. In certain other cases, it may be desirable to treat first with halogen and then wash with acid. This may be desirable where certain easily attacked impurities are desired in the form of halogenated or halogen treated products. Halogenation may be employed immediately after the removal of bases from the distillates by the dilute acid and in such cases, excellent aromatic hydrocarbons can be obtained after the distillation and the impurities, particularly in the case of benzols, form a valuable mixture which can be used as a solvent or for other purposes. The aromatic hydrocarbons, of course, are free from many of the impurities which are not removed by ordinary sulfuric acid wash and also are free from carbon disulfide which has been transformed into carbon tetrachloride or other harmless products.

When the halogen treatment is preceded by one or more concentrated sulfuric acid washes, some unsaturated compounds are first attacked and removed, and as has been pointed out above, the impurities which are removed after halogenation are not contaminated with some of the unsaturated products and are thus a more homogeneous and more useful product which is particularly desirable when the product is to be used as a solvent. The aromatic hydrocarbon fractions which are obtained are entirely similar to those obtained by the halogen treatment without sulfuric acid wash, and, of course, are characterized by the same high grade of purity and substantial absence of impurities which interfere with their use in catalytic reactions.

The preliminary treatment with the sulfuric acid is particularly desirable in the case of heavier distillates such as solvent naphtha and the like as these distillates contain not only resin forming bodies like cumaron and indene, but also other unsaturated aliphatic compounds which are non-resin forming and which are easily attacked by sulfuric acid. These products are removed by the acid wash and the following halogenating process removes the last traces of aliphatic compounds or undesirable alicyclic compounds such as cyclopentadiene and dicyclopentadiene. Heterocyclic compounds such as the thiophenes are also removed together with styrol and to a certain extent hydrindene which are transformed into high boiling halogenated products. The solvent naphtha or heavy solvent fractions are removed by distillation and the reduction or elimination of sulfuric acid washing prevents undesired polymerization of the cumarons and indenes present. The solvent naphtha thus provisionally purified can be subjected to conditions which favor polymerization and the resinophores polymerize to form high grade resins of very light color. The aromatic hydrocarbons can be distilled off and are obtained in a high state of purity. The yields of resins and aromatic hydrocarbons are very high.

By combining the sulfuric acid wash process with the halogenation process, it is possible to remove the undesired impurities in precisely the form in which they best can be used. Thus, certain impurities which are desired in a polymerized form can be removed by sulfuric acid, whereas other products which are desired in the form of halogenated bodies can be removed by the halogenating treatment. The combined process removes in the most satisfactory manner, all of the undesired impurities or transforms them into harmless products. In this manner, light oil fractions can be purified by removing aliphatic hydrocarbons such as pentane, hexane, amylene, hexylene, heptylene, octylene, alicyclic compounds such as cyclopentadiene, dicyclopentadiene, di- and tetrahydrobenzene, hydrindene and the like, heterocyclic compounds such as pyrrol, pyridine, thiophene, thiotolene, thioxene, and the like. Other sulfur compounds particularly carbon disulfide which may be present in the crude fractions are attacked by halogen and are transformed into other compounds such as carbon tetrachloride in the case of carbon disulfide. The presence of carbon tetrachloride in aromatic hydrocarbons is practically harmless as this compound is so indifferent that it does not interfere with the use of the hydrocarbons in catalytic processes or for the production of intermediates to be used in catalytic processes particularly reductions and hydrogenations.

The aromatic hydrocarbons produced by the present process are thus practically free from sulfur and are in a state of high purity.

The halogenation of the partially washed crude distillates or condensates may be effected by chlorine, or by bromine, but I have found that iodine is not active and accordingly the expression "active halogen" which will be used hereafter in the specification and claims is intended to include chlorine and bromine, but to exclude iodine. It should be noted, however, that iodine is an excellent halogen carrier, particularly for the halogenation of carbon disulfide. The halogenation may be effected by the use of elementary halogen such as chlorine, gaseous or liquid, or bromine or solutions such as chlorine or bromine water, bodies yielding chlorine or bromine, such as aqua regia, phosgene, sulfuryl chloride, nitrosyl chloride, hypochlorites, hypobromites, chlorides or hydrochloric acid in the presence of oxidizers and the like.

Liquid chlorine is particularly effective where the amount of impurities is large as the evaporation of the liquid absorbs large quantities of heat and prevents local rise of temperature due to the reaction of the chlorine with the impurities which reactions are for the most part exothermic. A local rise in temperature is undesirable in many cases particularly where it is desired to prevent the chlorination of side chains as side chain chlorination is accelerated by a rise in temperature.

Mixtures of the above chlorinating agents with or without elementary chlorine may also be used in the presence or absence of chlorine carries and mixtures of chlorinating and brominating agents may also be used.

Sulfur or sulfur compounds such as sulfur halides, sulfuryl chloride, thionylchloride, benzene sulfochloride and homologues, are preferably used singly or together as halogen carriers as they preferentially catalyze the halogenation and particularly the chlorination of acyclic, alicyclic, heterocyclic compounds while having but little effect on the halogenation of aromatic hydrocarbons. Nitrosylchloride may also be used.

The following halogen carriers may also be used singly or together; iron, ferric chloride or bromide, aluminum, aluminum halides, halides of antimony, tin, gold, tellurium, zirconium, uranium, vanadium, bismuth, molybdenum, zinc, copper, and nickel compounds, animal charcoal, wood charcoal or any other well known halogen carriers. The reaction may also be advantageously carried out in the presence of light, heat or silent electric discharge. Combinations of the chemical mixtures enumerated above and the physical catalysts such as light, heat and the like may be used.

The chlorination of carbon disulfide is particularly accelerated by iodine, bromine, metallic chlorides, aluminum chloride, aluminum turnings, ferric chloride, iron scale, iron sesquioxide, iron sulfide, ferrous carbonate, ferrous sulfate, antimony, either in the form of a powdered metal, oxide or chloride. Chemical compounds of the catalysts which preferentially catalyze the halogenation of the several classes of impurities may also be used.

The carriers may be added before or during halogenation or may be formed in halogenation. For example, hypochlorites may be decomposed with $SO_2$ forming sulfurylchloride which acts as chlorinating agent and carrier at the same time. Other combinations are also possible.

The halogenation and particularly chlorination may be carried out wholly in the liquid or vapor phase or partly in the liquid and partly in the vapor phase, with the same or with different halogen carriers or without carriers. The purification may be carried out in the liquid or vapor phase at atmospheric pressure or at pressure above or below atmospheric. The pressure may be the same throughout the purification or may be varied. The steps of washing and halogenating may both be a continuous or both batch processes or one step may be a batch and the other a continuous process.

The steps of acid washing and halogenating may be carried out simultaneously by the use of chlorsulfonic acid or similar reagent which halogenates and at the same time washes. The process may be also carried out partly by simultaneous halogenation and washing and partly by straight washing or halogenating. Thus the material may first be treated with chlorsulfonic acid and then with a straight halogenating agent or finally first washed with sulfuric acid, then treated with chlorsulfonic acid and finally treated with a straight halogenating agent.

Unremoved sulfuric acid and hydrochloric acid formed during chlorination may be neutralized by adding suitable substances before, during or after chlorination. Examples of neutralizing substances are soda ash, caustic alkalies, lime, slaked and unslaked, calcium carbonate, magnesia, ammonia and similar substances.

The purification by halogenation may be carried out in anhydrous solution or vapor phase by adding suitable driers such as anhydrous calciumchloride or copper sulfate, quick lime, etc.

The halogenation, particularly in vapor phase, may also be carried out in the presence of steam or water. In most cases the action of steam or water is to dilute the chlorine or chlorinating agent and there is also a strong tendency to prevent undesired condensation or polymerization. This latter feature may be of considerable importance where large amounts of resinifiable substances are present, as in crude solvent benzene and it is desired to prevent or retard condensation. The use of water or steam in vapor phase purification also aids in washing the distillate if allowed to condense with it or in the case of higher boiling hydrocarbons a more complete separation may be brought about by maintaining the condenser above the boiling point of water. In vapor phase purifications the steam may be introduced wholly into the liquid phase or into the vapor phase or partly in one and partly in the other. Chlorine and steam may be introduced together or separately. The steam may be wet or superheated and may be at about the boiling temperature of the mixture or may be at a much higher temperature and serve partly or wholly as the heating means. Both the washing and halogenating steps should be carried out with vigorous agitation in order to reduce the amount of reagents required.

The sequence of treatment with acid and with halogen, the numbers and intensities of treatments, of course, will vary with the products treated and with the use to which the impurities are to be put. I have outlined certain general principles guiding the choice of procedure and these principles will be further illustrated in the specific examples. The invention is, however, not limited to the details therein set forth and in any particular case, the skilled chemist will be guided in his choice of procedure by the conditions of the particular distillate or condensate with which he is working.

*Example 1*

Light oil is treated with caustic soda to remove phenols, fractionated and a crude benzene fraction coming over up to 105° C. is taken. This fraction is treated with 1 to 2% of 60° Bé. sulfuric acid, the addition of the acid being gradual, accompanied by a vigorous agitation. After about 25 minutes, agitation is stopped and the acid is allowed to settle for about 30 minutes and then drawn off. This acid, known as pyridine acid removes most of the pyridine. The mixture is permitted to stand for another 20 to 30 minutes and a further acid settling out is removed. The product may then be washed with water and 6-8% by weight of chlorine passed in at room temperature. The introduction should be through a chlorine distributor to insure a thorough distribution. The introduction of chlorine may also take place before washing with water, in which case the remaining sulfuric acid acts as a chlorine carrier. In either event, the solution becomes dark and the chlorine is absorbed quantitatively. 0.5-1% of sulfur or ferric chloride is advantageously added as a chlorine carrier to accelerate chlorination particularly of carbon disulfide.

After the reaction is completed, the mixture is washed with water and then with an alkali solution, dried and the benzol distilled off. A single column distillation is usually sufficient.

Corrosion of apparatus due to the hydrochloric acid formation can be prevented by adding soda ash or lime to the mixture before chlorination to neutralize the hydrochloric acid formed. Other bases may also be used and are advantageous in some cases.

The benezene hydrocarbons produced are of high chemical purity and contain only small amounts of carbon tetrachloride. The product being free from sulfur and containing only a little carbon tetrachloride is suitable for the production of derivatives to be used in catalytic reactions. The yield is about 97-99% of the theory. The chlorinated products remaining after distillation can be used as a solvent. Either the whole of the impurities may be so used or they may be fractionated to produce solvents of varying boiling points.

Example 2

A crude benzene fraction boiling up to 105° C. is freed from phenols and bases in the usual manner by means of alkali and sulfuric acid. The product is then treated with 0.2 to 0.5% by volume of 65-66° Bé. sulfuric acid with vigorous agitation. The agitation is continued 10-15 minutes, care being taken that the oil does not become too warm. The mixture is then allowed to settle and the tar acid which settles out in about 10 minutes is drawn off. After another 10 minutes, a further portion of the acid will have settled out and is also drawn off, whereupon the oil is washed with cold or warm water and a further washing with acid solution is not necessary. The benzol thus treated is partially freed from its impurities by the sulfuric acid and is then subjected to the chlorination process, about 3% of gaseous chlorine being passed in at room temperature with vigorous agitation. The color of the oil darkens and when a sample distilled off no longer shows any color with sulfuric acid in the standard test, the process is complete. An addition of about 0.5% of aluminum chloride as a carrier is of advantage, but is not absolutely necessary. On the other hand, the addition of calcium carbonate sufficient to neutralize the hydrochloric acid formed during the reaction is very desirable. After the reaction is completed, the mixture is washed with water and then with alkalies until neutral and the benzol distilled off. A single distillation is usually sufficient.

The benzol hydrocarbons produced are free from sulfur compounds and contain only small amounts of carbon tetrachloride. They are practically quantitatively free from aliphatic and alicyclic compounds and are well fitted for the production of intermediate compounds, particularly nitrobenzol which is to be used in the production of aniline by catalytic reduction with hydrogen. The yield of benzol is about 97-98.5% of the theory.

The residue from distillation consists in a chlorinated oil and can be distilled off to give a colorless or only a slightly colored solvent for many industrial purposes.

Example 3

A crude toluol fraction boiling from 105 to 120° C. is treated with alkali to remove phenols and then with dilute acids to remove bases. 0.2-0.5% of 60-66° Bé. sulfuric acid is poured in gradually with vigorous agitation. The agitation is maintained for fifteen to twenty minutes and then the acid is permitted to settle and drawn off as far as possible. The remaining acid is then washed out and the crude toluene fraction is partially chlorinated with about 2.5-3.5% of gaseous chlorine diluted with air. The oil darkens and the process is kept up until a distilled sample gives entirely negative results in the sulfuric acid test. Copper chloride can advantageously be used as a chlorine carrier. Neutralizing agents may be added at the beginning of the chlorination process or after it is completed and I have found that calcium carbonate is very satisfactory for this purpose.

After the chlorination is completed and the mixture has been neutralized the toluene is distilled off. The product is much purer than commercial toluene prepared by the ordinary sulfuric acid wash process and is well suited for the preparation of derivatives to be used in catalytic reductions. The yield is 97-99% of the theory which is much better than the ordinary yields with sulfuric acid as the elimination of the drastic washing with concentrated sulfuric acid prevents loss due to partial sulfonating of the aromatic hydrocarbons. The chlorinated residue can also be distilled and gives colorless or light yellow chlorinated products which are suitable for many purposes, particularly as cheap solvents.

Example 4

A crude benzene fraction such as is described in Example 1 is given the same preliminary treatment and is then treated with 3–4% of chlorine mixed with a little sulfur dioxide or burner gas, the chlorination taking place with vigorous agitation. The sulfur dioxide appears to accelerate the reaction, probably due to the formation of sulfuryl chloride which is an excellent chlorine carrier for the chlorination of aliphatic, alicyclic, heterocyclic and other compounds including organic sulfur compounds and carbon disulfide. The chlorine is absorbed rapidly and quantitatively and after all the chlorine has been absorbed the mixture is neutralized and washed, whereupon the benzene hydrocarbons are distilled off as described in Example 1. The yield is about 99% of the theory and the product being considerably purer than commercial benzene purified by the sulfuric acid.

Example 5

A crude benzene fraction boiling up to 105° C. is treated with alkali to remove phenols as described in Example 2 and also with moderately concentrated sulfuric acid to remove bases. The partially purified product is treated with 0.2–0.3% by volume of 65–66° Bé. sulfuric acid which partially removes aliphatic and alicyclic compounds. The mixture is then chlorinated in the presence of about 1% of iron oxide or iron sulfide, the amount of chlorine used being 2 to 3%. The temperature may rise to 40–50° C. but vigorous agitation should be maintained during the whole of the chlorination. The reaction product is then neutralized, washed and the benzene hydrocarbons distilled off as described in Example 1. The yield is about 97% and the product is of high purity being of considerably better quality than the corresponding commercial product purified by sulfuric acid alone. The product is very suitable for catalytic reactions or for motor fuels, as it is substantially free from suplfur compounds.

Example 6

A crude solvent naphtha fraction distilled from light oil and boiling between 130 and 150° C. is first treated with alkalies to remove phenols. Pyridine bases are removed in the usual way by sulfuric acid. Where the pyridine content is very high several washings of sulfuric acid of varying strengths may be desirable. The pyridine free oil which contains mainly xylol and similar compounds is partially chlorinated, using a little bromine or a bromide as a catalyst. The chlorine is passed in with vigorous agitation and if desired, with the addition of a small amount of benzene sulfo-chloride as a catalyst, until a sample distilled off gives no yellow coloring with sulfuric acid. Small amounts of soda may be added in order to prevent corrosion of the vessels. The product is then washed with water and distilled off, giving a water clear distillate which is fractionated and the xylol and fraction between 136.5° and 139° C. obtained. The xylol thus produced is of extraordinarily good quality and is well adapted for the production of intermediates. The chlorinated residue can be used as a high boiling solvent.

Example 7

Crude solvent naphtha fraction boiling between 140 and 160° C. is freed from phenols and bases and given a short sulfuric acid wash as described in Example 6. The acid wash is with 65–66° Bé. sulfuric acid to the amount of about 0.3 to 0.6%. The washing should last for about fifteen to twenty minutes and the acid then allowed to settle and draw off as far as possible. The crude solvent naphtha which has been subjected to this partial purification still gives a dark brown test with sulfuric acid.

After washing the crude naphtha with water 4 to 5% of chlorine is passed in with violent agitation in the form of a thin stream of liquid chlorine which is sprayed in under the surface. The temperature is preferably maintained below 30° C. Among other impurities cyclopentadiene, dicyclopentadiene, styrolene, hydrindene, and others are transformed into high boiling chlorinated products while cumarone and indene are hardly attacked at all. The product is washed with water in the usual way and the solvent naphtha distilled off, yielding a colorless oil. The aromatic hydrocarbons can be removed by polymerizing the cumarone and indene bodies with concentrated sulfuric acid or by distilling with or without steam. The aromatic hydrocarbons, as well as the solvent naphtha itself, are excellent solvents and are free from sulfur compounds or from compounds which would result in darkening on long exposure to light.

Example 8

A light oil fraction boiling between 160–180° C. is freed from bases and phenols in the usual way and is washed once or twice with a total amount of 0.5–1% of 65–66° Bé. sulfuric acid. The sulfuric acid is carefully washed out as described in Example 7 and the product is chlorinated with gaseous chlorine. In addition to the impurities described in the above example, the heavy, oily materials which are present are transformed into high boiling chlorinated products so that after distillation a colorless heavy benzene is obtained. The further treatment of the heavy benzene is carried out in a similar manner to that described in Example 7.

Example 9

A low boiling crude benzene fraction containing 2–3% of toluene and the usual impurities is treated with concentrated sulfuric acid as described in Example 2, and then thoroughly washed. The product is distilled in a column and gaseous chlorine is introduced into the bottom of the column, the rate of introduction being regulated so that the distillate, after washing, gives no color with the standard sulfuric acid test. The distillate can be collected and washed with water or dilute alkali or the vapor may be condensed in a wash tower or the hydrochloric acid formed may be removed in any other suitable manner. The process can be made a continuous one by adding fresh amounts of crude benzene to the still and removing the chlorinated impurities from the bottom of the still through a drain pipe. The chlorinated toluenes may be recovered from the waste sludge when it is present in sufficient amount to warrant recovery. The other components of the sludge may also be utilized as described in the examples above. A yield of highly purified benzene from 97 to 99% of the theory is obtainable and is not only substantially free from sulfur compounds but is also relatively free from toluene.

Example 10

A low boiling crude benzene fraction containing from 2 to 5% of toluene and the other usual impurities is treated as described in Example 9. In addition to the chlorine, however, a small amount of sulfur dioxide is introduced into the column as a gaseous catalyst. The sulfur dioxide and chlorine react to form sulfuryl chloride which strongly catalyzes the chlorination of the impurities and permits a considerable increase in output from the same apparatus. The sulfuryl chloride boils at a relatively high temperature and tends to flow back into the still where it is removed with the waste sludge. Small amounts of unreacted sulfur dioxide may at times pass off into the distillate but can be readily removed with an alkaline wash.

Example 11

A low boiling crude benzene fraction is purified as described in Examples 9 and 10. The still column is filled with iron fragments as a catalyst. The purification is very rapid but care should be taken not to use more chlorine than that required to combine with the impurities and with the toluene, as in the presence of sufficient chlorine iron catalyzes the chlorination of benzene itself.

Example 12

A crude benzene fraction boiling up to 105° C. is treated as in Example 2. Instead, however, of using a sulfuric acid wash with 0.2–0.5% of 55–66° Bé. sulfuric acid, a thorough washing with about 1% of the same acid is used. This wash is usually sufficient to produce commercial benzene but the benzene so treated still contains thiophene compounds, carbon disulfide and small amounts of paraffins. In order to remove these impurities the product is washed with water, an alkaline wash being unnecessary, as small amounts of sulfuric acid acts as positive catalysts in the chlorination to follow. The washed product is then selectively chlorinated, preferably in the presence of a little sulfur, bromine or aluminum chloride or several such catalysts. The amount of chlorine to be used is about 1 to 2%. After chlorination the product is thoroughly washed and distilled, giving a benzene of excellent quality which is far superior to commercial benzene.

In the claims, the expression, "coal tar distillate," is used to cover not only true distillates from coal tar, but also mixtures of similar chemical composition containing aromatic hydrocarbons and acyclic, alicyclic and heterocyclic impurities such as condensates from coal gas, benzol plant residues and the like.

Aromatic hydrocarbons purified by washing with strong sulfuric acid are available on the market in a definite technical grade. The expression "commercial product of technical grade" when used in the claims is to be understood to define the technical product or products obtainable on the market.

Having thus described my invention, what is claimed as new is—

1. The method of producing purified aromatic hydrocarbons which comprises subjecting an aromatic hydrocarbon mixture containing acyclic, alicyclic and heterocyclic impurities to the action of an amount of strong sulfuric acid insufficient to purify the mixture to a commercial product of the customary purity for technical grade products and thereupon subjecting the partially purified mixture to selective halogenation with an amount of active halogen sufficient to react with substantially all of the impurities but insufficient to effect substantial nuclear halogenation of the aromatic hydrocarbons, the halogenation taking place in the presence of halogen carriers which preferentially catalyze the halogenation of acyclic, alicyclic and heterocyclic compounds and carbon disulfide.

2. The method of producing purified aromatic hydrocarbons which comprises subjecting an aromatic hydrocarbon mixture containing acyclic, alicyclic and heterocyclic impurities to the action of an amount of strong sulfuric acid insufficient to purify the mixture to a commercal product of the customary purity for technical grade products and thereupon subjecting the partially purified mixture to selective halogenation with an amount of active halogen sufficient to react with substantially all of the impurities but insufficient to effect substantial nuclear halogenation of the aromatic hydrocarbons, the halogenation taking place in the presence of sulfur compounds other than those contained in the aromatic hydrocarbon mixture.

3. The method of producing purified aromatic hydrocarbons which comprises subjecting an aromatic hydrocarbon mixture containing acyclic, alicyclic and heterocyclic impurities to the action of an amount of strong sulfuric acid insufficient to purify the mixture to a commercial product of the customary purity for technical grade products and thereupon subjecting the partially purified mixture to selective halogenation with an amount of active halogen sufficient to react with substantially all of the impurities but insufficient to effect substantial nuclear halogenation of the aromatic hydrocarbons, acids present or set free during the step of selective halogenation and neutralizing the acids by means of bases.

4. The method of preparing purified aromatic hydrocarbons which comprises subjecting an aromatic hydrocarbon mixture containing acyclic, alicyclic and heterocyclic impurities to the action of an amount of strong sulfuric acid insufficient to purify the mixture to a commercial product of the customary purity, for technical grade products, adding a halogen carrier and subjecting the partially purified mixture to selective halogenation with an amount of active halogen sufficient to react with substantially all of the impurities but insufficient to effect substantial nuclear halogenation of the aromatic hydrocarbons.

5. The method of preparing purified aromatic hydrocarbons which comprises subjecting an aromatic hydrocarbon mixture containing acyclic, alicyclic and heterocyclic impurities to the action of an amount of strong sulfuric acid insufficient to purify the mixture to a commercial product of the customary purity for technical grade products, subjecting the partially purified mixture to a reagent capable of effecting acid wash and selective halogenation, the amount of the reagent being insufficient to attack all of the impurities present in the partially purified mixture and subjecting the partially washed and halogenated mixture to further selective halogenation by means of an amount of active halogen sufficient to react with substantially all of the remaining impurities but insufficient to effect substantial nuclear halogenation of the aromatic hydrocarbons.

6. The method of producing purified aromatic hydrocarbons which comprises subjecting an aromatic hydrocarbon mixture containing acyclic, alicyclic and heterocyclic impurities to the action of an amount of strong sulfuric acid insufficient to purify the mixture to a commercial product of the customary purity for technical grade products and thereupon subjecting the partially purified mixture to selective halogenation with an amount of active halogen sufficient to react with substantially all of the impurities but insufficient to effect substantial nuclear halogenation of the aromatic hydrocarbons, the selective halogenation taking place in the presence of physical catalytic conditions.

7. The method of producing purified aromatic hydrocarbons which comprises subjecting an aromatic hydrocarbon mixture containing acyclic, alicyclic and heterocyclic impurities to the action of an amount of strong sulfuric acid insufficient to purify the mixture to a commercial product of the customary purity for technical grade products and thereupon subjecting the partially purified mixture to selective halogenation with an amount of active halogen sufficient to react with substantially all of the impurities but insufficient to effect substantial nuclear halogenation of the aromatic hydrocarbons, the selective halogenation being carried out under conditions which will result in substantial side chain halogenation of the side chain aromatic hydrocarbons present.

8. The method of producing purified aromatic hydrocarbons which comprises subjecting an aromatic hydrocarbon mixture containing acyclic, alicyclic and heterocyclic impurities to the action of an amount of strong sulfuric acid insufficient to purify the mixture to a commercial product of the customary purity for technical grade products and thereupon subjecting the partially purified mixture to selective halogenation with an amount of active halogen sufficient to react with substantially all of the impurities but insufficient to effect substantial nuclear halogenation of the aromatic hydrocarbons, the selective halogenation being carried out in the liquid phase by means of liquid halogen.

9. The method of producing purified aromatic hydrocarbons which comprises subjecting an aromatic hydrocarbon mixture containing acyclic, alicyclic and heterocyclic impurities to the action of an amount of strong sulfuric acid insufficient to purify the mixture to a commercial product of the customary purity for technical grade products and thereupon subjecting the partially purified mixture to selective halogenation with an amount of active halogen sufficient to react with substantially all of the impurities but insufficient to effect substantial nuclear halogenation of the aromatic hydrocarbons, the selective halogenation taking place in the presence of steam.

10. The method of producing purified aromatic hydrocarbons which comprises subjecting an aromatic hydrocarbon mixture containing acyclic, alicyclic and heterocyclic impurities to the action of an amount of strong sulfuric acid insufficient to purify the mixture to a commercial product of the customary purity for technical grade products and thereupon subjecting the partially purified mixture to selective halogenation with an amount of active halogen sufficient to react with substantially all of the impurities but insufficient to effect substantial nuclear halogenation of the aromatic hydrocarbons, the selective halogenation taking place in the liquid phase in the presence of steam.

11. As a new product a mixture of halogen reacted acyclic, alicyclic and heterocyclic impurities of coal tar distillates and substantially free from impurities which react readily with small amounts of strong sulfuric acid.

Signed at St. Louis, Missouri, this 8th day of April, 1926.

ALPHONS O. JAEGER.